United States Patent
Fukuhara (10) Patent No.: US 10,091,624 B2
(45) Date of Patent: Oct. 2, 2018

(54) DATA PROVIDING SYSTEM (71) Applicant: Mitsubishi Electric Corporation, Tokyo (JP)

(72) Inventor: Hideki Fukuhara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/527,154

(22) PCT Filed: Dec. 8, 2014

(86) PCT No.: PCT/JP2014/082432
§ 371 (c)(1),
(2) Date: May 16, 2017

(87) PCT Pub. No.: WO2016/092616
PCT Pub. Date: Jun. 16, 2016

(65) Prior Publication Data
US 2017/0339532 A1 Nov. 23, 2017

(51) Int. Cl.
*H04W 24/00* (2009.01)
*H04W 4/06* (2009.01)
(Continued)

(52) U.S. Cl.
CPC .............. *H04W 4/06* (2013.01); *G01C 21/26* (2013.01); *H04M 11/00* (2013.01); *H04W 4/04* (2013.01); *H04W 16/18* (2013.01)

(58) Field of Classification Search
CPC ... G01C 21/26; H04M 11/00; H04M 1/72572; H04W 4/04; H04W 4/046; H04W 16/18; H04W 4/06
(Continued)

(56) References Cited

U.S. PATENT DOCUMENTS 6,484,093 B1 * 11/2002 Ito .................... G01C 21/34
340/990
2007/0244818 A1 10/2007 Tsuji et al.
(Continued)

FOREIGN PATENT DOCUMENTS

JP 2001-235335 A 8/2001
JP 2003-219468 A 7/2003
(Continued)

*Primary Examiner* — Nhan Le
(74) *Attorney, Agent, or Firm* — Birch, Stewart, Kolasch & Birch, LLP (57) ABSTRACT Each of data receiving devices 20 includes a receiver 22 configured to receive data from a data providing device 10, and a transmitter 21 configured to transmit throughput information indicating a current position and a throughput, to the data providing device 10. The data providing device 10 includes: a receiver 11 configured to receive pieces of the throughput information; a planning unit 12 configured to, on the basis of the received pieces of throughput information, determine preceding data receiving devices 20 existing at positions preceding the current position of a target data receiving device 20 on the same route, and generate a data providing plan for the target data receiving device 20 on the basis of the throughputs of the preceding data receiving devices 20; and a transmitter 13 configured to provide data to the target data receiving device 20 in accordance with the generated data providing plan.

9 Claims, 6 Drawing Sheets (51) Int. Cl.
*H04W 4/04* (2009.01)
*H04W 16/18* (2009.01)
*G01C 21/26* (2006.01)
*H04M 11/00* (2006.01)

(58) Field of Classification Search
USPC .................. 455/418, 456.3, 456.5; 370/338
See application file for complete search history.

(56) References Cited

U.S. PATENT DOCUMENTS

| | | | |
|---|---|---|---|
| 2008/0248815 A1* | 10/2008 | Busch | H04W 4/02 455/456.5 |
| 2011/0106969 A1 | 5/2011 | Choudhury et al. | |
| 2012/0238297 A1 | 9/2012 | Nakagawa et al. | |

FOREIGN PATENT DOCUMENTS

| | | |
|---|---|---|
| JP | 2005-204218 A | 7/2005 |
| JP | 2005-315625 A | 11/2005 |
| JP | 2008-11077 A | 1/2008 |
| JP | 2012-235334 A | 1/2008 |
| JP | 2012-195771 A | 10/2012 |
| JP | 2013-543323 A | 11/2013 |
| WO | WO 2005/112369 A1 | 11/2005 |
| WO | WO 2008/117420 A1 | 10/2008 |

* cited by examiner

DATA PROVIDING SYSTEM

TECHNICAL FIELD

The present invention relates to a data providing system that provides data from a data providing device to a data receiving device mounted on a moving object, via wireless communications.

BACKGROUND ART

In transmission and reception of data such as streaming data or data for use in applications which need to be executed in real time, from a server to a client mounted on a moving object using a wireless communication line, its throughput (an amount of data per unit time) is greatly affected by the influence of a wireless state such as an electric field strength and fading environment. More specifically, the client has largely different throughputs at the different wireless states. Namely, even if the server performs scheduling of distribution of the same amount of data to each of two or more clients having different throughputs, the different data amounts per unit time are transmitted to those clients respectively. Thus, their respective different transmission times for the same amount of data are required, thus causing low accuracy in transmission efficiency.

Further, as long as the network resource is limited in the wireless communications, the transmission efficiency gets worse as the amount of data for transmission to the clients increases. It is therefore important to perform scheduling after accurately predicting future throughputs so that the network resource can be used efficiently.

An invention disclosed in Patent Literature 1 relates to a system for optimizing the quality of playback of data such as video data which requires real-time processing. A client predicts future conditions of a wireless communication line in accordance with both application data and an evaluation of the quality of wireless communications, in order to ensure the quality of video playback, and then sends to a server a request for the amount of video transmission data depending on the predicted conditions. However, although no problem arises when the client is in a stationary state, when the client moves, the influence of an electric field strength and fading environment cannot be neglected, and, as a result, the predicted conditions greatly differ from the actual conditions.

An invention disclosed in Patent Literature 2 relates to a content distribution control system that distributes content data provided by a server to a client via a relay device. This system predicts a load on the relay device on the basis of the throughput of the client, and generates a distribution schedule in such a way that the predicted load does not exceed a predetermined load amount. However, its object is to use network resources efficiently by increasing the amount of the data transmission which is carried out within an off-peak time period during which the network traffic is very small (for example, within a time period between midnight to early morning). For types of the data, no real-time processing is required, and it is further assumed that the generation of a distribution schedule is carried out on a day-by-day basis.

CITATION LIST

Patent Literatures

Patent Literature 1: Japanese Patent Application Publication (Translation of PCT International Application) No. 2013-543323.

Patent Literature 2: International Application Publication No. WO2005/112369.

SUMMARY OF INVENTION

Technical Problem

In the above-mentioned inventions disclosed in Patent Literatures 1 and 2, the influence of the wireless state affecting the throughput of a data receiving device mounted on a moving object is not taken into account, causing the problem that future throughputs of the data receiving device cannot be predicted accurately. Therefore, when the data requiring real-time processing is provided to the data receiving device mounted on the moving object, it is difficult to generate a data providing plan with high accuracy, and difficult to efficiently use network resources.

The present invention is made in order to solve the above-mentioned problems, and it is therefore an object of the present invention to provide a technique of, when generating a plan to provide data from a data providing device to a data receiving device mounted on a moving object, accurately predicting a future throughput of the data receiving device on the moving object.

Solution to Problem

According to the present invention, there is provided a data providing system that provides data from a data providing device to data receiving devices which are mounted on moving objects, via wireless communications. Each of the data receiving devices includes: a receiver configured to receive data provided by the data providing device; and a transmitter configured to transmit a piece of throughput information indicating both a current position and a throughput, to the data providing device. The data providing device includes: a receiver configured to receive the pieces of throughput information transmitted by the data receiving devices; a planning unit configured to, on the basis of the pieces of throughput information received from the data receiving devices, determine preceding data receiving devices that are data receiving devices existing at positions preceding a current position of a data receiving device being a target for plan generation on the same route, and generate a data providing plan for the data receiving device being a target for plan generation, on the basis of the throughputs of the preceding data receiving devices; and a transmitter configured to provide data to the data receiving device being a target for plan generation, in accordance with the data providing plan generated by the planning unit.

Advantageous Effects of Invention

According to the present invention, since a data providing plan is generated on the basis of the throughputs of data receiving devices existing at positions preceding the current position of a data receiving device which is a target for plan generation on the same route, the future throughput of the data receiving device on a moving object can be accurately predicted to generate a data providing plan.

DESCRIPTION OF EMBODIMENTS

Hereafter, in order to explain the present invention in greater detail, various embodiments of the present invention will be described with reference to the accompanying drawings.

Embodiment 1

Figure 1:
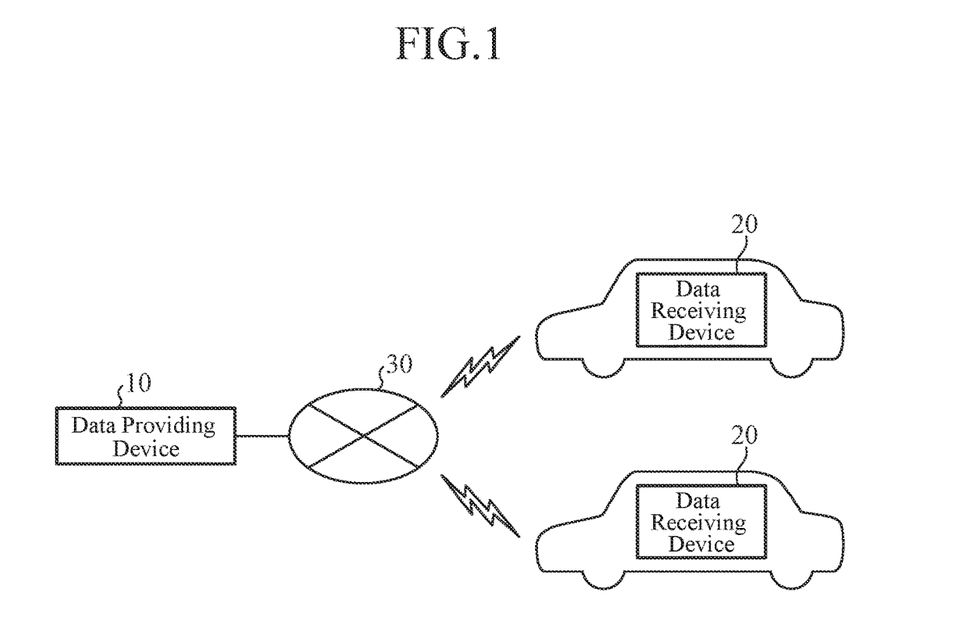
FIG. 1 is a diagram illustrating an example of the configuration of a data providing system according to Embodiment 1 of the present invention.

FIG. 1 is a diagram illustrating an example of the configuration of a data providing system according to Embodiment 1 of the present invention. The data providing system according to Embodiment 1 includes a data providing device 10 disposed outside vehicles, and data receiving devices 20 respectively mounted on the vehicles. The data providing device 10 and each of the data receiving devices 20 are connected to each other via a wireless communication line 30 provided by a communication common carrier, so that the data providing device and each of the data receiving devices can communicate with each other.

The data providing device 10 is a server outside the vehicles, and provides data for applications to each of the data receiving devices 20.

Each of the data receiving devices 20 is a mobile communication terminal capable of executing applications, which is, for example, a vehicle-mounted unit fixed to a vehicle, or a mobile information terminal such as a smart phone which a user carries into a vehicle. Further, each of the data receiving devices 20 is not limited to one intended for vehicles, and can be alternatively one for moving objects such as persons, railroad cars, ships or airplanes.

Figure 2:
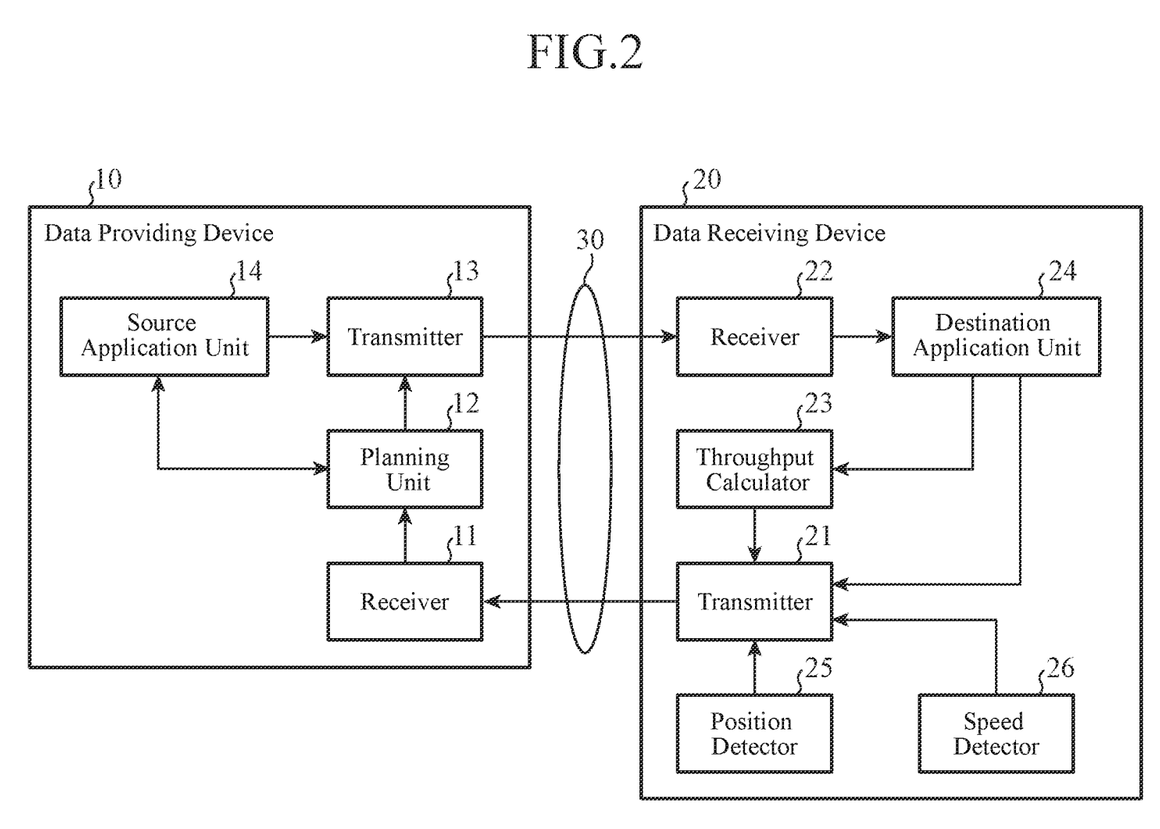
FIG. 2 is a block diagram showing an example of the internal configurations of a data providing device and each of data receiving devices according to Embodiment 1.

FIG. 2 is a block diagram showing an example of the internal configurations of the data providing device 10 and each of the data receiving devices 20 according to Embodiment 1.

Each of the data receiving devices 20 includes a transmitter 21, a receiver 22, a throughput calculator 23, a destination application unit 24, a position detector 25 and a speed detector 26.

The transmitter 21 receives the throughput of the data receiving device 20 from the throughput calculator 23, receives requested data information from the destination application unit 24, receives the current position of the data receiving device 20 from the position detector 25, and receives the moving speed of the data receiving device 20 from the speed detector 26. The transmitter 21 then transmits the received throughput, requested data information, current position and moving speed, as throughput information, to the data providing device 10 via the wireless communication line 30.

When the data providing device 10 generates a data providing plan on the basis of the current positions of data receiving devices 20, as will be described below, the throughput information needs to indicate at least the current position and the throughput. When the data providing device 10 generates a data providing plan on the basis of the current positions and moving speeds of data receiving devices 20, the throughput information needs to indicate at least the current position, the moving speed and the throughput.

The receiver 22 receives data provided from the data providing device 10 via the wireless communication line 30, and outputs the data to the destination application unit 24.

The throughput calculator 23 receives a notification of the amount of data for applications which is indicated by the data received by the receiver 22 and which is used by the destination application unit 24 from the destination application unit 24, and calculates the throughput. The throughput calculator 23 notifies the transmitter 21 of the throughput calculated from the amount of data for applications.

The throughput calculator 23 can alternatively calculate the throughput from the amount of data received by the receiver 22.

The destination application unit 24 executes an application by using the data received from the receiver 22. The destination application unit 24 also notifies the throughput calculator 23 of the amount of data of the data received from the receiver 22. The destination application unit 24 further notifies the transmitter 21 of the requested data information indicating the amount of data required to execute the application.

For example, when executing an application for navigation, the destination application unit 24 displays map data provided from the data providing device 10. The map data for navigation is data which requires real-time processing. Further, as the requested data information in this case, information indicating the destination of the vehicle or the like is provided.

Further, for example, when executing an application for playing back a video image or apiece of music, the destination application unit 24 plays back streaming data about a video image or a piece of music, the streaming data being provided from the data providing device 10. Further, as the requested data information in this case, information indicating the amount of buffer for the streaming data, or the like is provided.

The position detector 25 detects the current position of the data receiving device 20, and notifies the transmitter 21 of the current position. The position detector 25 can have a function of receiving GPS (Global Positioning System) signals and calculating the current position, or can acquire the current position from a GPS device installed in the vehicle. In the latter case, the position detector 25 treats the current position of the vehicle as the current position of the data receiving device 20.

The speed detector 26 detects the moving speed of the data receiving device 20, and notifies the transmitter 21 of the moving speed. The speed detector 26 can include a sensor such as a speed meter, or can alternatively acquire the moving speed from a speed meter or similar devices installed in the vehicle. In the latter case, the speed detector 26 treats the moving speed of the vehicle as the moving speed of the data receiving device 20.

In each of the data receiving devices 20, the destination application unit 24, the position detector 25 and the speed detector 26 are not indispensable. These components can be alternatively disposed outside each of the data receiving devices 20.

The data providing device 10 includes a receiver 11, a planning unit 12, a transmitter 13 and a source application unit 14.

This data providing device 10 generates a data providing plan for each of the data receiving devices 20 which are connected to the data providing device 10 via the wireless communication line 30, and provides data to each of the data receiving devices 20 in accordance with the corresponding data providing plan. Hereafter, a method of generating a data providing plan for one device selected as a target from among the data receiving devices 20 will be explained. A data receiving device 20 which is the target for plan generation is referred to as the "target data receiving device 20", and other data receiving devices 20 which is used for the generation of a data providing plan for the target data receiving device 20 is referred to as the "preceding data receiving devices 20."

The receiver 11 receives the pieces of throughput information from the respective data receiving devices 20 via the wireless communication line 30. The throughput information indicates the current position, moving speed, throughput and requested data information of the data receiving device 20.

The planning unit 12 receives the pieces of throughput information of the data receiving devices 20 from the receiver 11, and determines preceding data receiving devices 20 for the target data receiving device 20 on the basis of the current positions indicated by the pieces of throughput information. Specifically, the planning unit 12 specifies data receiving devices 20 as preceding data receiving devices 20 which exist at positions, on the same route, preceding the current position of the target data receiving device 20, and extracts the pieces of throughput information of the preceding data receiving devices 20.

As an alternative, on the basis of the current positions and the moving speeds indicated by the received pieces of throughput information, the planning unit 12 can specify data receiving devices 20 as preceding data receiving devices 20 which move at positions, on the same route, preceding the current position of the target data receiving device 20 and at speeds equal to the moving speed of the target data receiving device 20. It is preferable to specify preceding data receiving devices 20 which move at the same speed as the moving speed of the target data receiving device 20 because their throughputs are affected by the influence of their moving speeds. Nonetheless, the preceding data receiving devices do not necessarily have the same speed strictly. For example, the margin of their moving speeds can be within a range of plus or minus 5 km/h from the moving speed of the target data receiving device 20.

When information indicating a destination is included in each of the pieces of throughput information, the planning unit 12 can specify preceding data receiving devices 20 existing at positions, on the same route, preceding the target data receiving device 20 on the basis of the current positions and the destinations. On the other hand, when no information indicating a destination is included in each of the pieces of throughput information, the planning unit 12 can predict future routes of data receiving devices 20 from time-changes of the current positions, determine whether or not each of the data receiving devices 20 exists on the same route, and then specify preceding data receiving devices 20 existing at positions preceding the target data receiving device 20.

The planning unit 12 further notifies the source application unit 14 of the throughput information of the target data receiving device 20, and causes the source application unit to determine both the amount of data to be provided to the target data receiving device 20, and a point at which the provision of this data to be provided is to be completed. Hereafter, a geographic point at which the provision of the data to be provided is to be completed is referred to as the "provision-completion point".

The planning unit 12 then estimates the time of arrival at which the target data receiving device 20 will reach the provision-completion point, in accordance with the current position and moving speed which are indicated by the throughput information of the target data receiving device 20, and calculates a required throughput from this time of arrival and the amount of data to be provided. The planning unit 12 then determines the throughput of the target data receiving device 20 at the position of each of preceding data receiving devices 20 on the basis of the calculated throughput and the throughputs of the preceding data receiving devices 20, and generates a data providing plan. The transmitter 13 is notified of the generated data providing plan.

Because the planning unit can accurately predict the future throughput of the target data receiving device 20 by using the throughputs of the preceding data receiving devices 20, the data providing device can generate and implement an appropriate data providing plan. Further, by using the pieces of throughput information of the preceding data receiving devices 20 moving at substantially the same speed as that of the target data receiving device 20, the planning unit can generate a data providing plan taking into consideration the fact that the throughput varies depending on the moving speed.

After generating a data providing plan, the planning unit 12 can further acquire the throughput information from the target data receiving device 20 and correct the data providing plan. For example, when the actual throughput of the target data receiving device 20 is lower than the throughput predicted for the data providing plan, the planning unit 12 corrects this data providing plan.

The transmitter 13 transmits the data provided by the destination application unit 24 to the target data receiving device 20 in accordance with the data providing plan generated by the planning unit 12.

The source application unit 14 provides streaming data or data which needs to be executed in real time to the target data receiving device 20.

The source application unit 14 further determines both the amount of data to be provided and the provision-completion point at which the provision of this data to be provided is completed, on the basis of the throughput information of the target data receiving device 20 received from the planning unit 12. The planning unit 12 is notified of both the determined amount of data to be provided and the determined provision-completion point.

Figure 3:
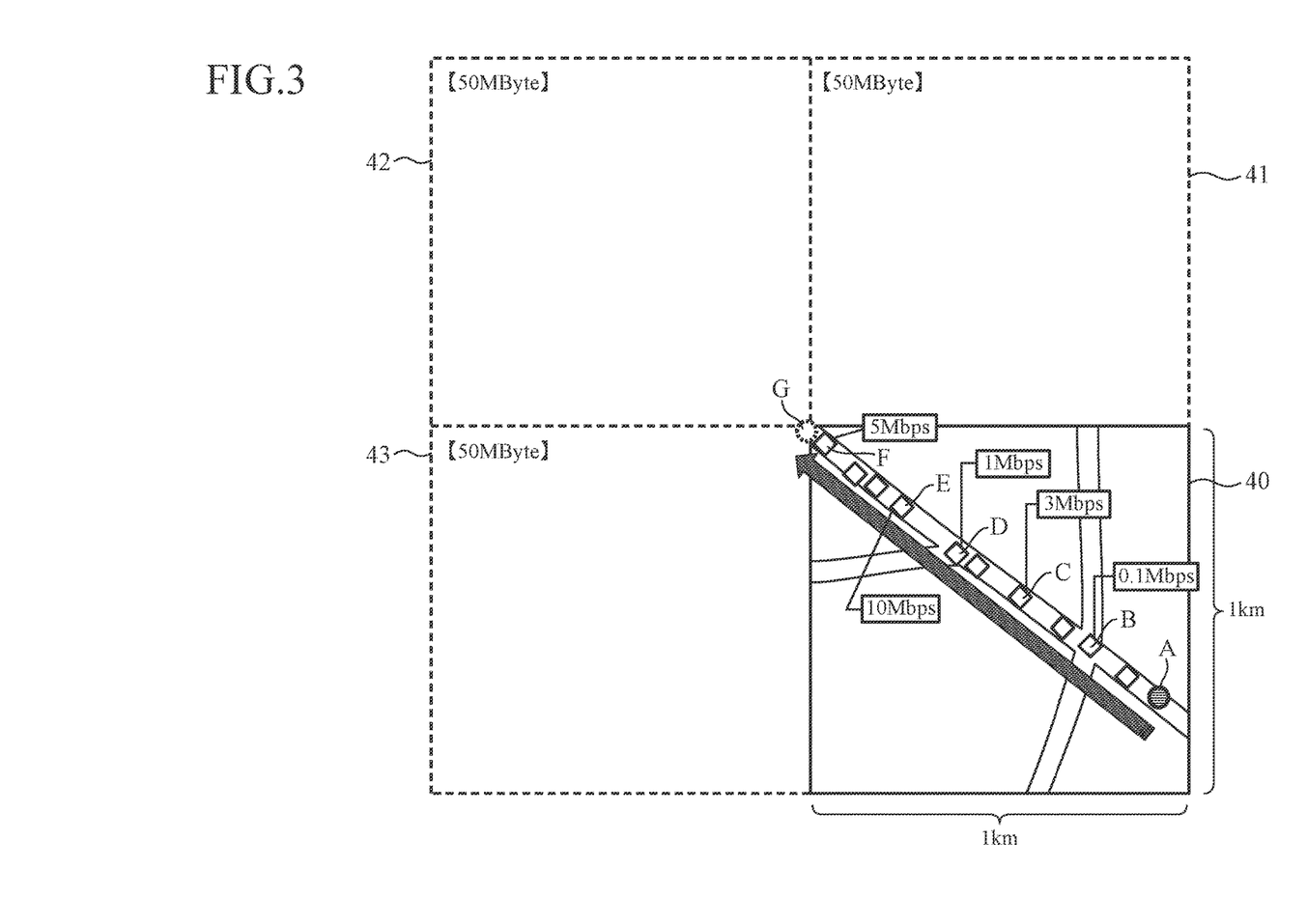
FIG. 3 is a diagram for explaining an example of the generation of a data providing plan in Embodiment 1.
Figure 4:
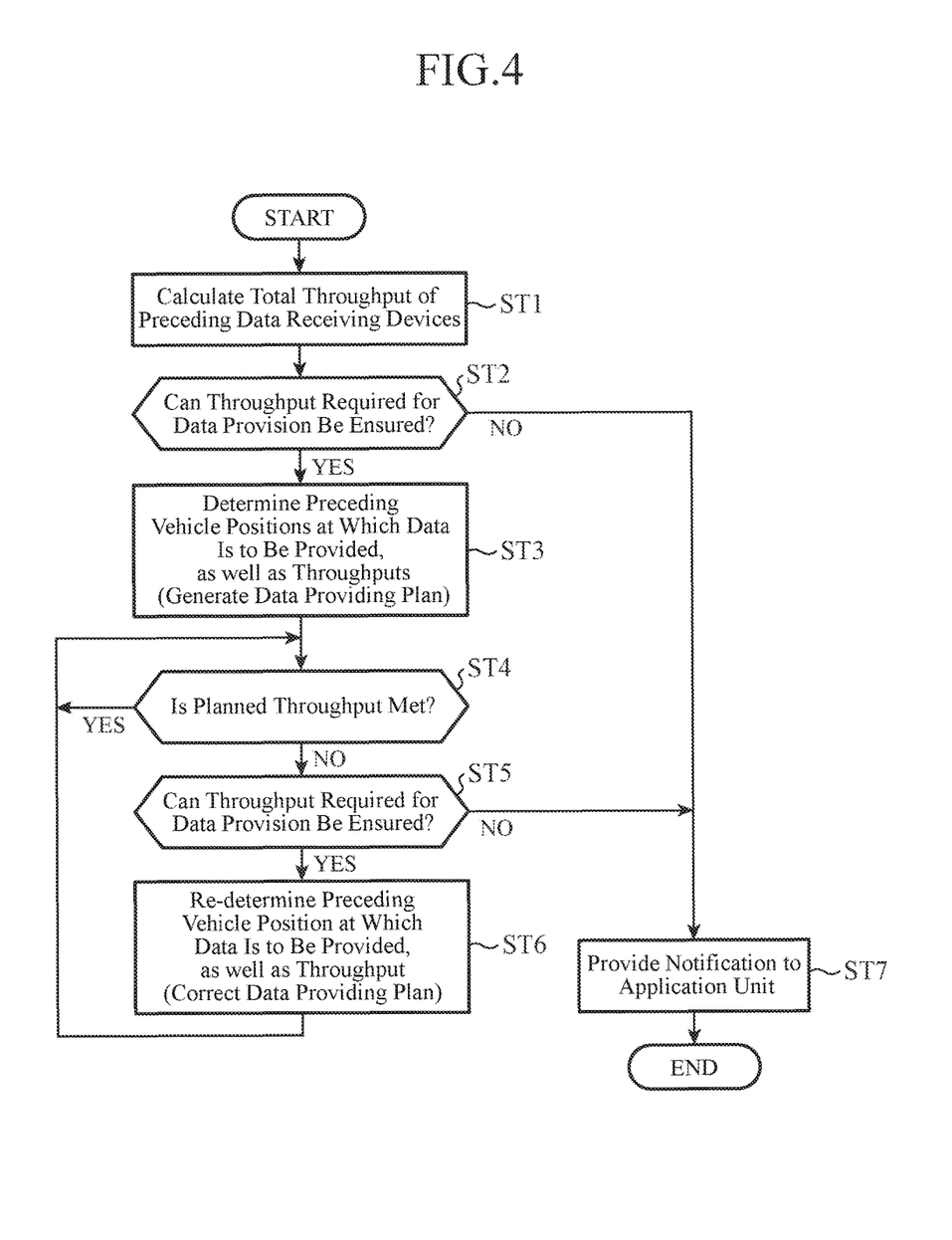
FIG. 4 is a flow chart showing a method of generating a data providing plan which the data providing device according to Embodiment 1 uses.

FIG. 3 is a diagram for explaining an example of the generation of a data providing plan. By using a situation shown in this figure as an example, the method of generating a data providing plan, which is shown in FIG. 4, will be explained.

In this example, a case in which the destination application unit 24 of the target data receiving device 20 executes an application for navigation to display map data 40, 41, 42 or 43 provided from the data providing device 10 will be explained. For explanation, several vehicles on which the target data receiving device 20 is mounted and other vehicles in which preceding data receiving devices 20 are respectively mounted are illustrated on the map data 40. A circle mark on the map data 40 represents the current position of the vehicle A in which the target data receiving device 20 is mounted, and the vehicle A is in a state in which the vehicle is traveling in a direction shown by an arrow at a speed of 60 km per hour. Vehicles denoted by white squares are traveling, in the arrow direction, ahead of the vehicle A and along the route along which the vehicle A is traveling, and one data receiving device is mounted on each of the vehicles. Preceding data receiving devices 20 are mounted on the vehicles B to F among the vehicles denoted by the white squares.

The map data 40 represents only an area at a distance of up to 2 km from the current position of the vehicle. Therefore, the destination application unit 24 of the target data receiving device 20 needs to receive the map data 41, 42 and 43 from the data providing device 10 by the time when the vehicle A reaches the provision-completion point G 2 km ahead of the current position. Therefore, the target data receiving device 20 transmits the throughput information indicating the requested data information in which the provision-completion point G is set as a destination, the current position and the moving speed to the data providing device 10.

The data providing device 10 receives pieces of throughput information from data receiving devices 20 including the target data receiving device 20, and outputs the pieces of throughput information to the planning unit 12.

The planning unit 12 uses the pieces of throughput information received by the receiver 11, and specifies preceding data receiving devices 20 on the basis of the current position (the position of the vehicle A), moving speed (60 km per hour) and destination (the point on the traveling route and 2 km ahead of the current position) of the target data receiving device 20, and extracts the pieces of throughput information of the preceding data receiving devices. In the example shown in FIG. 3, the pieces of throughput information of the preceding data receiving devices 20 respectively mounted on the vehicles B to F which are moving at substantially the same speed as the moving speed of the vehicle A are extracted. The throughputs of the preceding data receiving devices 20 respectively mounted on the vehicles B, C, D, E and F are 0.1 Mbps, 3 Mbps, 1 Mbps, 10 Mbps and 5 Mbps. The planning unit 12 calculates the total of the throughputs of the preceding data receiving devices 20 respectively mounted on the vehicles B to F as 19.1 Mbps on the basis of the extracted pieces of throughput information (in step ST1).

The planning unit 12 notifies the source application unit 14 of the throughput information of the target data receiving device 20, which is received by the receiver 11, to cause the source application unit to determine both the amount of data to be provided and the provision-completion point G. The amount of data to be provided which needs to be provided to the target data receiving device 20 while the vehicle A travels from its current position to the provision-completion point G is the total of 150 MBytes=1,200 Mbits of the map data 41, 42 and 43.

The planning unit 12 calculates the time of arrival required for the vehicle A traveling at a speed of 60 km per hour to reach the provision-completion point G 2 km ahead of the current position as 120 seconds, and determines whether or not a throughput of 10 Mbps required for data provision of the amount of data to be provided of 1,200 Mbits can be ensured before a lapse of the time of arrival (in step ST2).

Because the total of the throughputs of the preceding data receiving devices 20 of the vehicles B to F can be expected to be 19.1 Mbps, the required throughput of 10 Mbps can be met ("YES" in step ST2). At that time, the planning unit 12 determines a throughput at which data is provided to the target data receiving device 20 at each of the positions of the vehicles B to F on the basis of the pieces of throughput information of the preceding data receiving devices 20 of the vehicles B to F, and writes this throughput into the data providing plan (in step ST3).

A method of assigning a throughput to the target data receiving device 20 at each of the positions of the vehicles B to F can be arbitrary. In this regard, because the resource of the wireless communications is limited, occupation of all of the resource by only one data receiving device results in decrease in the resource utilization efficiency. Therefore, it is preferable to provide data to the target data receiving device 20 at a time when the target data receiving device 20 reaches the position of a preceding vehicle at which its data receiving device exhibits a relatively-high throughput. More specifically, the planning unit 12 selects, as targets for assignment, the positions of the vehicles C, E and F, among the vehicles B to F, at which their data receiving devices exhibit relatively-high throughputs. In this regard, because the vehicle F is close to the provision-completion point G, the vehicle F can be excluded from the targets, and the vehicles C and E can be selected as final targets.

Because the throughput required for data provision to the target data receiving device 20 is 10 Mbps, the planning unit 12 also takes the resource utilization efficiency into consideration, and generates a data providing plan to assign 2.5 Mbps for the throughput of 3 Mbps at the position of the vehicle C, and assign 7.5 Mbps for the throughput of 10 Mbps at the position of the vehicle E.

This explanation is made as an example, and the method of assigning a throughput to each of the positions is not limited to this example.

In this way, in the case in which the type of data to be provided indicates map data, the planning unit 12 generates a data providing plan in which the provision of the map data 41, 42 and 43 representing an upcoming area will be completed before the target data receiving device 20 moves into the upcoming area from the area represented by received map data 40, by determining a throughput at which data is to be provided to the target data receiving device 40, for each of the respective positions of preceding data receiving devices 20.

After, in step ST3, generating the data providing plan, the planning unit 12 notifies the transmitter 13 of the data providing plan, to cause the transmitter to provide the map data in accordance with the plan. Specifically, the planning unit 12 instructs the transmitter 13 to set the throughput to 2.5 Mbps at a time when the vehicle A in which the target data receiving device 20 is mounted reaches the position of the vehicle C, and instructs the transmitter 13 to set the throughput to 7.5 Mbps at a time when the vehicle A reaches the position of the vehicle E.

"The positions of the vehicles C and E" which are mentioned above mean the positions which are determined when the preceding data receiving devices 20 respectively mounted on the vehicles C and E transmit the pieces of throughput information (i.e., the current positions indicated by the pieces of throughput information), and it is expected that the vehicles C and E are actually traveling further away from the positions at the times that the vehicle A reaches "the positions of the vehicles C and E." Further, a change of the position of the vehicle A can be predicted from, for example, the current position and moving speed which are indicated by the piece of throughput information of the target data receiving device 20.

In contrast, when the total of the throughputs of the preceding data receiving devices 20 of the vehicles B to F is lower than the required throughput for data provision to the target data receiving device 20 (when "NO" in step ST2), the planning unit 12 notifies the source application unit 14 that it is impossible to complete the provision of the data by the time the target data receiving device reaches the provision-completion point G (in step ST7).

After, in step ST3, generating the data providing plan, every time the data providing device receives the throughput information from the target data receiving device 20, the planning unit 12 determines whether the actual throughput indicated by the received throughput information meets the planned throughput (in step ST4). For example, when the vehicle A reaches the position of the vehicle C and, at that time, the actual throughput of the target data receiving device 20 is 1 Mbps, the actual throughput is 1.5 Mbps lower than 2.5 Mbps assigned to that position in the data providing plan ("NO" in step ST4). At that time, the planning unit 12 determines whether or not a total throughput of 9 Mbps which is the total of the throughput of 1.5 Mbps which is a shortage at the position of the vehicle C, and the throughput of 7.5 Mbps assigned to the position of the vehicle E ahead of the position of the vehicle C can be ensured (in step ST5). Because it can be expected that the throughput at the position of the vehicle E is 10 Mbps, the planning unit determines that the required throughput of 9 Mbps can be met ("YES" in step ST5). At that time, the planning unit 12 re-determines the throughput assigned to the position of the vehicle E to be 9 Mbps, and corrects the data providing plan (in step ST6).

Although the throughput at the position of the vehicle E meets the required throughput in this example, if there occurs a shortage of the required throughput by only using the throughput at the position of the vehicle E, the planning unit 12 can re-determine preceding data receiving devices 20 (for example, extracts the pieces of throughput information of the data receiving devices 20 respectively mounted on the vehicles D to F), and can re-generate a data providing plan.

In contrast, when the required throughput cannot be ensured even if the data providing plan is corrected (when "NO" in step ST5), the planning unit 12 notifies the source application unit 14 that it is impossible to complete the provision of the data by the time the target data receiving device reaches the provision-completion point G (in step ST7).

Next, a case in which the data to be provided is streaming data such as video image data or music data will be explained. In this case, the destination application unit 24 of each of the data receiving devices 20 determines requested data information in accordance with the amount of buffer of streaming data. For example, assume a case in which an amount of buffer (15 MBytes) corresponding to 30 seconds of streaming data playback time is made available in the destination application unit 24, and the playback is performed continuously as long as 2-second long data (1 MByte) is stored in the buffer, but the playback is suspended when the amount of stored data decreases to less than an amount corresponding to two seconds. For example, when the current amount of buffer is 5 MBytes, and 1-MByte or more data is further required within ten seconds in order to continuously perform the playback, the destination application unit 24 generates requested data information for making a request for 1-MByte or more data within ten seconds. The transmitter 21 transmits throughput information including this requested data information, the current position (the position of the vehicle A) and the moving speed (60 km per hour) to the data providing device 10.

The planning unit 12 extracts the pieces of throughput information of preceding data receiving devices 20 existing in a region which the vehicle A traveling at a speed of 60 km per hour can reach within a provision completed time of 10 seconds, and determines whether or not a throughput of 0.8 Mbps required for the provision of 1-MByte data within 10 seconds can be ensured. For example, when the preceding vehicles existing in the region which the vehicle A can reach within 10 seconds are the vehicles B to D in the example shown in FIG. 3, the planning unit 12 can expect the total of the throughputs at the positions of the vehicles B to D to be 4.1 Mbps, and therefore determines that the total of the throughputs can meet the required throughput of 0.8 Mbps. At that time, the planning unit 12 excludes the positions of the vehicles B and D having a low throughput from the targets in consideration of the resource utilization efficiency, and generates a data providing plan to assign 0.8 Mbps to the position of the vehicle C having a relatively high throughput.

As mentioned above, when the type of the data to be provided is streaming data, the planning unit 12 determines a throughput at which data is to be provided to the target data receiving device 20 for each of the positions of preceding data receiving devices 20, thereby generating a data providing plan to complete the provision of 1-Mbyte streaming data (a throughput of 0.8 Mbps) required for continuous playback before a lapse of 10 seconds after which the playback of the received streaming data is suspended in the target data receiving device 20.

As mentioned above, each of the data receiving devices 20 according to Embodiment 1 is configured to include the receiver 22 that receives data provided by the data providing device 10, and the transmitter 21 that transmits the piece of throughput information indicating both the current position and the throughput, to the data providing device 10. Further, the data providing device 10 is configured to include: the receiver 11 that receives the pieces of throughput information transmitted by the data receiving devices 20; the planning unit 12 that, on the basis of the pieces of throughput information received from the data receiving devices 20, determines preceding data receiving devices 20 that are data receiving devices 20 existing at positions preceding the current position of a target data receiving device 20 on the same route, and generates a data providing plan for the target data receiving device 20 on the basis of the throughputs of the preceding data receiving devices 20; and the transmitter 13 that provides data to the target data receiving device 20 in accordance with the data providing plan generated by the planning unit 12. With this configuration, when generating a plan to provide data from the data providing device 10 to a data receiving device 20 mounted on a moving object, the data providing device is capable of accurately predicting the future throughput of the data receiving device 20 mounted on the moving object. Therefore, an appropriate data providing plan to provide either streaming data or data for use in applications which need to be executed in real time can be generated, and the efficient use of the network resource can be achieved.

Further, according to Embodiment 1, the transmitter 21 of the data receiving device 20 can be configured to transmit the throughput information indicating the moving speed as well as the current position and the throughput, and the planning unit 12 of the data providing device 10 can be configured to, on the basis of the pieces of throughput information received from the plurality of data receiving devices 20, data receiving devices 20 as preceding data receiving devices 20 which move at positions preceding the current position of the target data receiving device 20 on the same route, and at speeds equal to the moving speed of the target data receiving device 20. By taking the moving speed into consideration, this configuration is capable of predicting the future throughput more accurately compared with the case in which only the current position is taken into consideration.

Further, the planning unit 12 according to Embodiment 1 is configured to, after generating the data providing plan, correct the data providing plan using the piece of throughput information received from the target data receiving device 20. This configuration is capable of generating a data providing plan with higher accuracy.

Further, the planning unit 12 according to Embodiment 1 is configured to generate, when the data to be provided is map data, a data providing plan in which provision of map data representing an upcoming area will be completed before the target data receiving device 20 enters into the upcoming area from an area represented by received map data, by determining the throughput at which data is to be provided to the target data receiving device 20, for each of the respective positions of the preceding data receiving devices 20. Further, the planning unit 12 is configured to generate, when the data to be provided is streaming data, a data providing plan in which provision of the amount of streaming data required for continuous playback is completed before playback of received streaming data will be suspended in the target data receiving device 20, by determining the throughput at which data is to be provided to the target data receiving device 20, for each of the respective positions of the preceding data receiving devices 20. This configuration is capable of generating a data providing plan appropriately depending upon the type of the data to be provided.

Embodiment 2

In Embodiment 2, a method of generating a data providing plan when there are two or more types of data to be provided will be explained.

Figure 5:
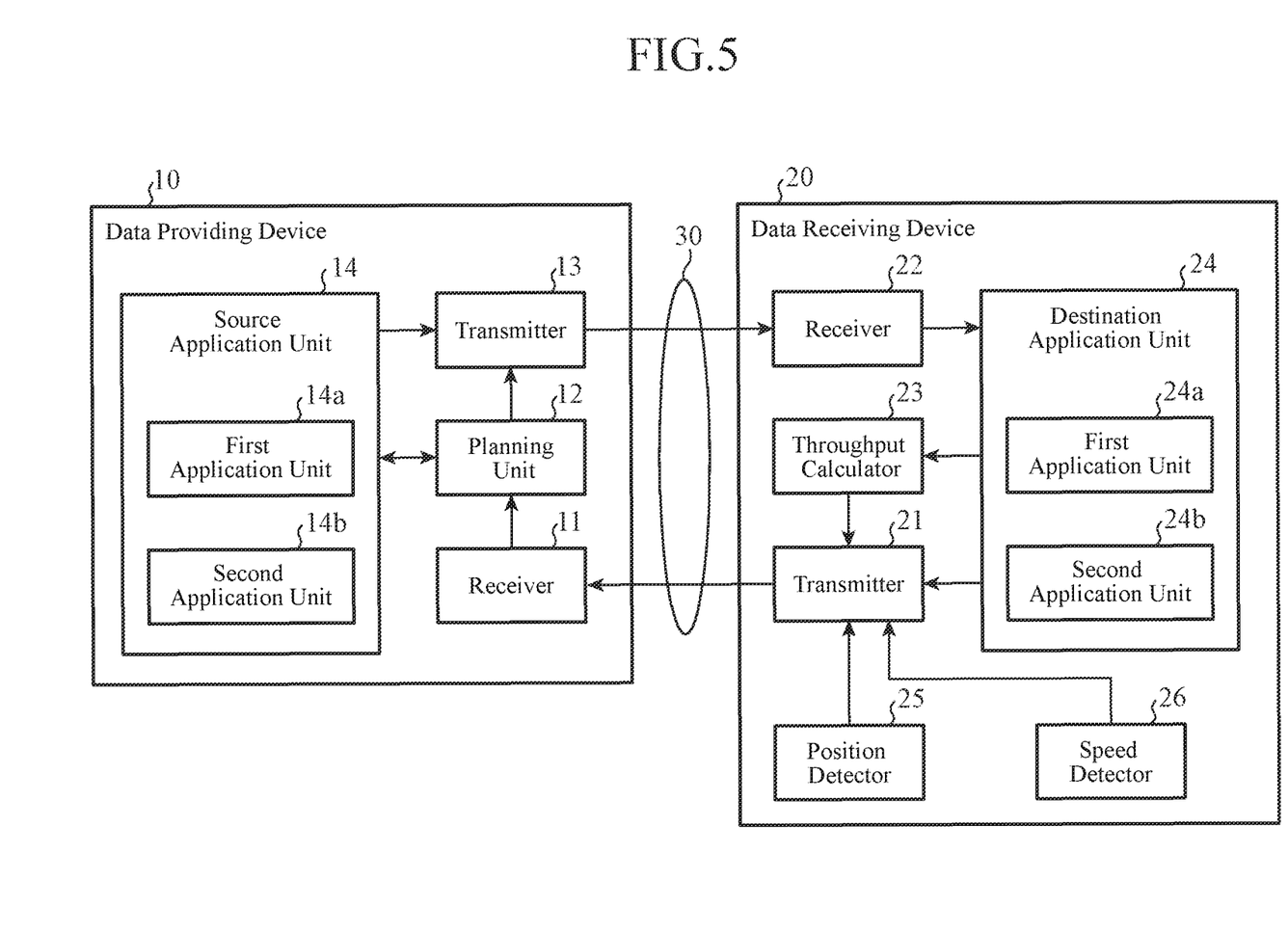
FIG. 5 is a block diagram showing an example of the internal configurations of a data providing device and each of data receiving devices according to Embodiment 2.

FIG. 5 is a block diagram showing an example of the internal configurations of a data providing device 10 and each of data receiving devices 20 according to Embodiment 2. In this FIG. 5, the same components as those of FIG. 2 or like components are designated by the same reference numerals, and the explanation of the components will be omitted hereafter.

In Embodiment 2, a source application unit 14 of the data providing device 10 includes a first application unit 14*a* that provides map data for navigation, and a second application unit 14*b* that provides streaming data for playback of a video image and music.

In the case of this configuration, the source application unit 14 determines the amount of data to be provided of map data and its corresponding provision-completion point, as well as the amount of data to be provided of streaming data and its corresponding provision completed time, and notifies a planning unit 12 of these pieces of information. The planning unit 12 generates a data providing plan for the map data and the streaming data. The details of the generating method will be described below.

Further, in Embodiment 2, a destination application unit 24 of each of the data receiving devices 20 has a first application unit 24*a* that displays the map data for navigation, and a second application unit 24*b* that plays back the streaming data for playback of a video image and music.

In the case of this configuration, the destination application unit 24 notifies a throughput calculator 23 of both the amount of data of the map data and the amount of data of the streaming data. The throughput calculator 23 calculates a throughput for the map data and a throughput for the streaming data on the basis of the amount of data received from the destination application unit 24. A transmitter 21 transmits throughput information indicating both the throughput for the map data and requested data information, and the throughput for the streaming data and requested data information to the data providing device 10.

Next, the data providing plan generating method according to Embodiment 2 shown in FIG. 6 will be explained. Hereafter, the conditions explained in above-mentioned Embodiment 1 are used with reference to FIG. 3, just as they are. More specifically, for a target data receiving device 20 mounted on a vehicle A, the throughput required for the provision of the map data is 10 Mbps and the throughput required for the provision of the streaming data is 0.8 Mbps, and the total of the throughputs is 10.8 Mbps.

In addition, it is assumed that the map data has a higher priority than the streaming data.

Figure 6:
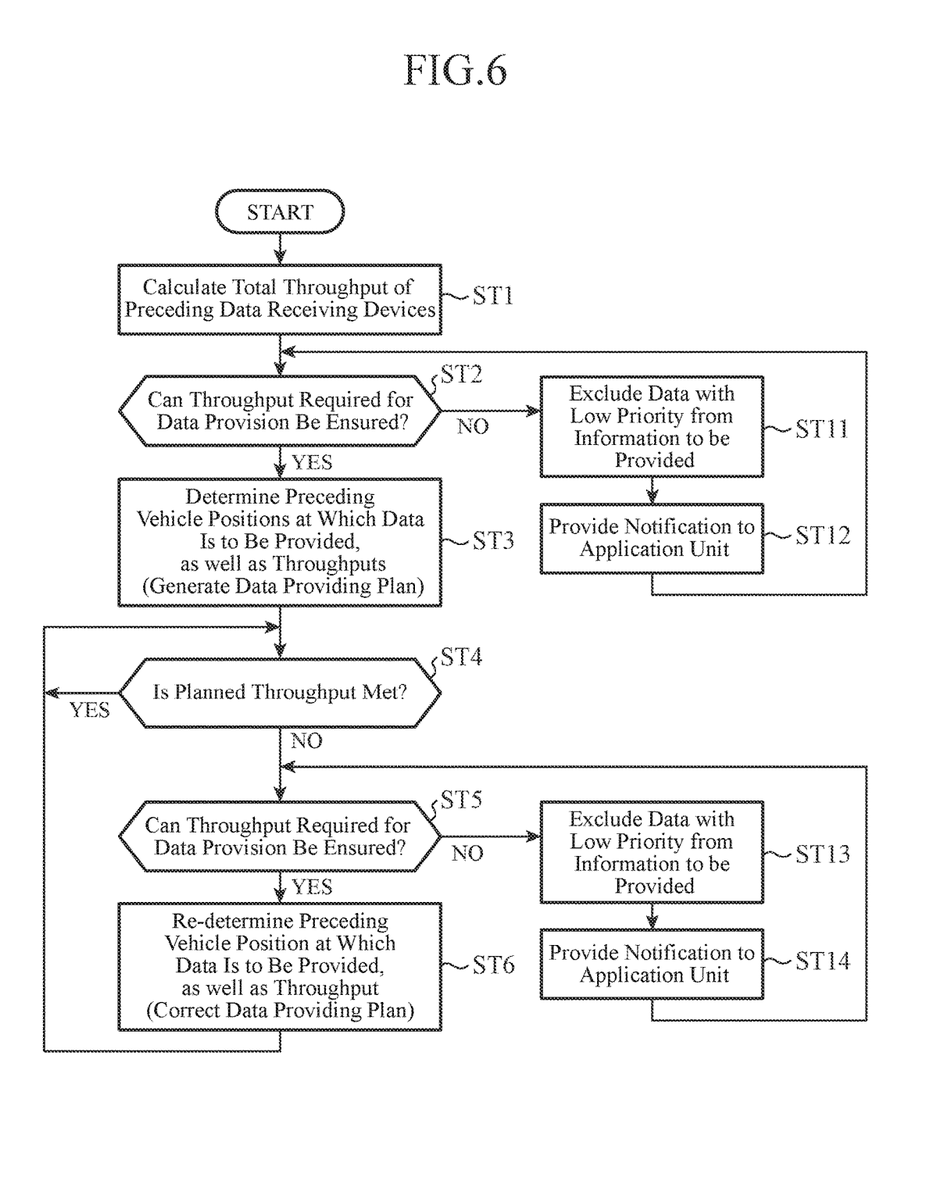
FIG. 6 is a flow chart showing a method of generating a data providing plan which the data providing device according to Embodiment 2 uses.

In step ST1 shown in FIG. 6, the planning unit 12 carries out the same process as that of step ST1 shown in FIG. 4, and calculates the total of the throughputs of the preceding data receiving devices 20 of vehicles B to F as 19.1 Mbps.

The planning unit 12 determines whether or not a throughput of 10.8 Mbps required for the provision of the map data and the streaming data can be ensured (in step ST2). Because in this example it can be expected that the total of the throughputs of the preceding data receiving devices 20 of the vehicles B to F is 19.1 Mbps, the required throughput of 10.8 Mbps can be met ("YES" in step ST2). At that time, the planning unit 12 determines a throughput at which data is to be provided to the target data receiving device 20 at each of the positions of the vehicles B to F on the basis of the pieces of throughput information of the preceding data receiving devices 20 of the vehicles B to F, and writes this throughput into the data providing plan (in step ST3).

For example, the provision-completion point G of the map data is 2 km ahead of the current position of the target data receiving device, while the streaming data can be provided before the target data receiving device reaches a point, 167 m ahead of the current position, which the target data receiving device can reach within the provision completed time of 10 seconds. Therefore, the planning unit 12 assigns a throughput of 0.8 Mbps to the streaming data at the position of the vehicle C and also assigns a throughput of 1.5 Mbps to the map data at the position of the vehicle C, so that the total of the throughputs is determined to be 2.3 Mbps. The planning unit 12 further assigns a throughput of 0.5 Mbps to the map data at the position of the vehicle D and also assigns a throughput of 8 Mbps to the map data at the position of the vehicle E.

This explanation is made as an example, and the method of assigning a throughput to each of the positions is not limited to this example.

In contrast, when the total of throughputs of the preceding data receiving devices 20 of the vehicles B to F is lower than the throughput of 10.8 Mbps required for the provision of the map data and streaming data (when "NO" in step ST2), the planning unit 12, in step ST11, excludes the data with a low priority from information to be provided. Because the priority of the streaming data is lower than that of the map data in this example, the planning unit 12 excludes the streaming data from information to be provided (in step ST11), and notifies the second application unit 14*b*, which is the source of the streaming data, that the streaming data is excluded from the information to be provided (in step ST12).

The planning unit 12 returns to step ST2 again, and determines whether or not the throughput of 10 Mbps required for the provision of only the map data can be ensured by using the total of the throughputs of the preceding data receiving devices 20 of the vehicles B to F. When the throughput of 10 Mbps required for the provision of only the map data can be ensured (when "YES" in step ST2), the planning unit 12 generates a data providing plan to provide only the map data (in step ST3).

As mentioned above, the data providing device according to Embodiment 2 excludes data with a low priority from the information to be provided on a step-by-step basis until the throughput required for data provision can be ensured, thereby generating a data providing plan which is capable of providing data with a high priority.

After generating the data providing plan in step ST3, the planning unit 12 carries out the same processes as those in steps ST4 to ST6 of FIG. 4.

In this regard, when the actual throughput of the target data receiving device 20 does not meet the throughput assigned in the data providing plan (when "NO" in step ST4), and the throughput required for the provision of data to be provided cannot be ensured at a time of correcting the data providing plan (when "NO" in step ST5), the planning unit 12 excludes the data with a low priority from information to be provided (in step ST13), and notifies the application unit which is the source of the excluded data (in step ST14).

When, in step ST11 or ST13, only one type of data remains as information to be provided and the amount of data to be provided cannot be reduced anymore, and the throughput required for the provision of this one type of data cannot be ensured, the planning unit 12 can notify the source application unit 14 that the provision of the data cannot be completed, and can end the data providing plan generating process.

As mentioned above, the data providing device 10 according to Embodiment 2 is configured in such a way that, with respect to two or more types of data to be provided from the data providing device 10 to the target data receiving device 20, when a throughput required for provision of the two or more types of data exceeds a total of the respective throughputs of preceding data receiving devices 20, the planning unit 12 generates a data providing plan in which data with a high priority type among the two or more types of data is provided on a priority basis. Therefore, the data providing device is capable of generating the data providing plan to provide two or more types of data, and, when the data providing device cannot accomplish a data providing plan to provide all of the types of data, capable of generating a data providing plan to provide data with a high priority.

Embodiment 3

Because configurations of a data providing device 10 and each of data receiving devices 20 according to Embodiment 3 have the same graphical representations as those shown in FIG. 2 or 5, the illustrations of the data providing device and each of the data receiving devices will be omitted.

In Embodiment 3, a data providing plan generating method at a time when there exists no throughput information other than the throughput information of a target data receiving device 20, such as when a data providing system is used for the first time or when no preceding data receiving device 20 exists, will be explained.

A planning unit 12 of the data providing device 10 according to Embodiment 3 generates a data providing plan on the basis of the electric field area map of a base station, the electric field area map being provided by a communication common carrier. The electric field area map shows an electric field strength distribution of a wireless communication line 30. In this electric field area map, the throughput becomes high at a place where the electric field strength is high, whereas the throughput becomes low at a place where the electric field strength is low. The planning unit 12 holds the electric field area map in advance, and, when there exists no throughput information other than that of the target data receiving device 20, generates a data providing plan on the basis of a throughput which is predicted from the electric field strength of the electric field area map, instead of the throughputs of preceding data receiving devices 20.

In this regard, there are base stations for use in mobile phones providing service areas each having a radius of 1 to 3 km, and there are also base stations for use in mobile phones providing service areas each having a radius of 3 to 6 km. Therefore, the throughput which is predicted from the electric field area map of a base station has a low degree of accuracy. In contrast with this, in the data providing systems according to above-mentioned Embodiments 1 and 2, a larger number of pieces of throughput information which can be used for the generation of a data providing plan can be acquired as the preceding data receiving devices 20 are existing more densely. For example, throughput information can be acquired for each of many points in each area having a radius of 1 km. Therefore, the future throughput can be predicted accurately compared with the case of using the electric field area map, and a higher-accuracy data providing plan can be generated. Therefore, it is preferable that when the data providing device becomes able to receive pieces of throughput information from preceding data receiving devices 20, the planning unit 12 stops the use of the electric field area map and then switches to the use of the pieces of throughput information from the preceding data receiving devices 20.

The planning unit 12 can be configured to, discard throughput information whose descriptions becomes old after a lapse of a predetermined time since the throughput information has been received by a receiver 11. Because the planning unit can generate a data providing plan by using the latest throughput information in this configuration, the accuracy can be further improved.

When there is no latest throughput information, the planning unit 12 generates a data providing plan by using the electric field area map, as mentioned above. As an alternative, the planning unit 12 can store the throughput information whose descriptions becomes old after a lapse of the predetermined time since the throughput information has been received by the receiver 11, and, when there is no latest throughput information, generate a data providing plan by using the past throughput information stored.

As mentioned above, the planning unit 12 according to Embodiment 3 is configured to, when no throughput information is received, generate a data providing plan on the basis of an electric field area map representing the electric field strength distribution of the wireless communications. Therefore, even if there is no throughput information of any other data receiving device 20 preceding the target data receiving device 20, the planning unit is capable of generating a data providing plan for the target data receiving device 20.

While the present invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The data providing system according to the present invention is configured to predict a future throughput of a data receiving device from the positions and throughputs of other data receiving devices preceding that data receiving device, and therefore is suitable for use as a data providing system or similar system that provides data such as streaming data to a data receiving device mounted on a moving object.

REFERENCE SIGNS LIST

10: data providing device; 11: receiver; 12: planning unit; 13: transmitter; 14: source application unit; 14a: first application unit; 14b: second application unit; 20: data receiving device; 21: transmitter; 22: receiver; 23: throughput calculator; 24: destination application unit; 24a: first application unit; 24b: second application unit; 25: position detector; 26: speed detector; 30: wireless communication line; and 40 to 43: map data.

The invention claimed is:

1. A data providing system that provides data from a data providing device to data receiving devices which are mounted on moving objects, via wireless communications, each of said data receiving devices including:
a receiver to receive data provided by said data providing device;
a throughput measuring device to measure a throughput in terms of an amount of data receivable per unit time; and
a transmitter to transmit a piece of throughput information indicating both a current position and the measured throughput, to said data providing device, and
said data providing device including:
a receiver to receive the pieces of throughput information transmitted by said data receiving devices;
a planning unit to, on a basis of the pieces of throughput information received from said data receiving devices, determine preceding data receiving devices that are data receiving devices existing at positions preceding a current position of a data receiving device being a target for plan generation on a same route, and generate a data providing plan for said data receiving device being a target for plan generation, on a basis of the throughputs of said preceding data receiving devices; and
a transmitter to provide data to said data receiving device being a target for plan generation, in accordance with said data providing plan generated by said planning unit.

2. The data providing system according to claim 1, wherein:
said transmitter of each of said data receiving devices transmits the piece of throughput information indicating a moving speed as well as the current position and the throughput; and
said planning unit of said data providing device determines, on a basis of the pieces of throughput information received from said data receiving devices, said preceding data receiving devices that are data receiving devices which move at positions preceding a current position of said data receiving device being a target for plan generation on a same route, and at speeds equal to a moving speed of said data receiving device being a target for plan generation.

3. The data providing system according to claim 1, wherein, after generating said data providing plan, said planning unit corrects said data providing plan using the piece of throughput information received from said data receiving device being a target for plan generation.

4. The data providing system according to claim 1, wherein, on a basis of the respective throughputs of said preceding data receiving devices at the respective positions of said preceding data receiving devices, said planning unit determines a throughput at which data is to be provided to said data receiving device being a target for plan generation.

5. The data providing system according to claim 4, wherein, when the data provided from said data providing device to said data receiving device being a target for plan generation is map data, said planning unit generates the data providing plan in which provision of map data representing an upcoming area is completed before said data receiving device being a target for plan generation enters into the upcoming area from an area represented by received map data, by determining the throughput at which data is to be provided to said data receiving device being a target for plan generation, for each of the respective positions of said preceding data receiving devices.

6. The data providing system according to claim 4, wherein, when the data provided from the said data providing device to said data receiving device being a target for plan generation is streaming data, said planning unit generates the data providing plan in which provision of an amount of streaming data required for continuous playback is completed before playback of received streaming data will be suspended in said data receiving device being a target for plan generation, by determining the throughput at which data is to be provided to said data receiving device being a target for plan generation, for each of the respective positions of said preceding data receiving devices.

7. The data providing system according to claim 1, wherein:
said transmitter of each of said data receiving devices transmits the piece of throughput information indicating a moving speed as well as the current position and the throughput; and
said planning unit of said data providing device determines, on a basis of the pieces of throughput information including the moving speeds received from said data receiving devices, said preceding data receiving devices that are data receiving devices which move at positions preceding a current position of said data receiving device being a target for plan generation on a same route.

8. A data providing system that provides data from a data providing device to data receiving devices which are mounted on moving objects, via wireless communications, each of said data receiving devices including:
a receiver to receive data provided by said data providing device; and
a transmitter to transmit a piece of throughput information indicating both a current position and a throughput, to said data providing device, and
said data providing device including:
a receiver to receive the pieces of throughput information transmitted by said data receiving devices;

a planning unit to, on a basis of the pieces of throughput information received from said data receiving devices, determine preceding data receiving devices that are data receiving devices existing at positions preceding a current position of a data receiving device being a target for plan generation on a same route, and generate a data providing plan for said data receiving device being a target for plan generation, on a basis of the throughputs of said preceding data receiving devices; and a transmitter to provide data to said data receiving device being a target for plan generation, in accordance with said data providing plan generated by said planning unit, wherein, with respect to two or more types of data to be provided from said data providing device to said data receiving device being a target for plan generation, when a throughput required for provision of said two or more types of data exceeds a total of the respective throughputs of said preceding data receiving devices, said planning unit generates the data providing plan in which data with a high priority type among said two or more types of data is provided on a priority basis.

9. A data providing system that provides data from a data providing device to data receiving devices which are mounted on moving objects, via wireless communications, each of said data receiving devices including:

a receiver to receive data provided by said data providing device; and a transmitter to transmit a piece of throughput information indicating both a current position and a throughput, to said data providing device, and said data providing device including:

a receiver to receive the pieces of throughput information transmitted by said data receiving devices;

a planning unit to, on a basis of the pieces of throughput information received from said data receiving devices, determine preceding data receiving devices that are data receiving devices existing at positions preceding a current position of a data receiving device being a target for plan generation on a same route, and generate a data providing plan for said data receiving device being a target for plan generation, on a basis of the throughputs of said preceding data receiving devices; and a transmitter to provide data to said data receiving device being a target for plan generation, in accordance with said data providing plan generated by said planning unit, wherein, when said throughput information is not received, said planning unit generates the data providing plan in accordance with an electric field area map representing an electric field strength distribution of said wireless communications.

* * * * *